United States Patent Office 3,193,561
Patented July 6, 1965

3,193,561
NOVEL CARBAMATES OF 5- AND 6-MEMBERED HETERO-SULFUR COMPOUNDS AND PROCESS FOR PREPARING SAME
Roger Williams Addor, Pennington, N.J., assignor to American Cyanamid Company, Stamford, Conn., a corporation of Maine
No Drawing. Filed Sept. 20, 1962, Ser. No. 225,135
8 Claims. (Cl. 260—327)

The present application is a continuation-in-part of a copending application for Letters Patent, Serial No. 112,531, filed on May 25, 1961, now abandoned, which in turn is a continuation-in-part of a copending application for Letters Patent, Serial No. 40,539, filed on July 5, 1960, now abandoned.

The present invention relates to carbamates of heterocyclic sulfur moieties containing from five to six atoms and has as its principal object the utilization of such carbamates as the active component of an insecticidal composition.

The novel hetero-sulfur compounds prepared in accordance with the present invention may be represented by the general formula:

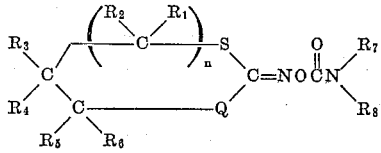

wherein $R_1$, $R_2$, $R_3$, $R_4$, $R_5$ and $R_6$ are hydrogen, lower alkyl or phenyl radicals, which may be the same or different, $n$ is an integer from 0 to 1, Q represents either a sulfur or oxygen atom, and $R_7$ and $R_8$ are hydrogen or lower alkyl radicals.

In general, the compounds of the present invention may be prepared by a number of diverse processes. Illustrative of one such process involves the reaction between (1) either a 2-oximino derivative of the heterocyclic sulfur moiety or the corresponding alkali metal salt thereof and (2) either an isocyanate or a carbamyl halide. Each reactant is advantageously present in equimolar amounts at temperatures ranging from about 0° C. to about 100° C.

The over-all reaction may be represented as:

[I]
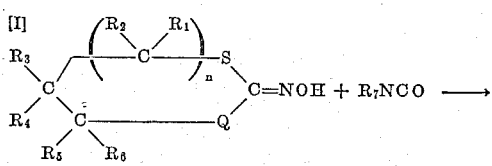

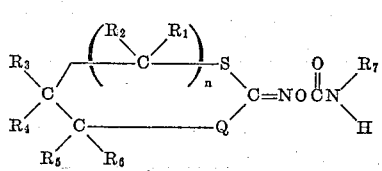

and

[Ia]
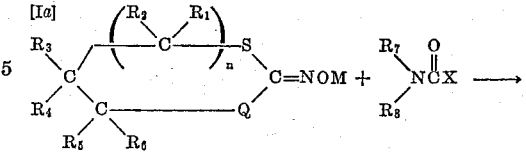

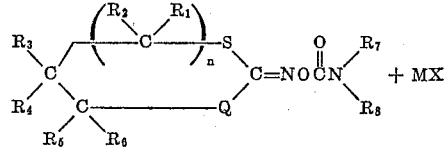

wherein $R_1$, $R_2$, $R_3$, $R_4$, $R_5$, $R_6$ and $n$ represent the same values as above; $R_7$ and $R_8$ represent hydrogen or lower alkyl and may be the same or different; M is an alkali metal, such as sodium, potassium or lithium; and X is a halogen atom, such as fluoro, chloro, bromo or iodo.

Alternatively, the carbamates of the present invention can be prepared by the reaction between 2-oximino heterocyclic sulfur compounds or the corresponding alkali metal salts thereof and phosgene, followed by further reaction with either ammonia, a primary amine or a secondary amine in accordance with the following over-all reactions:

[A]
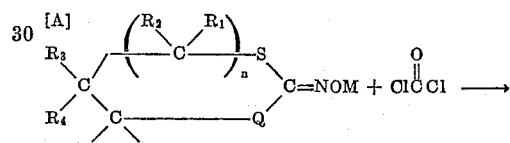

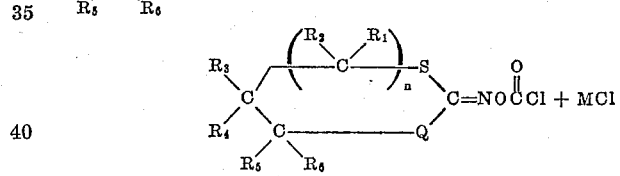

and

[B]
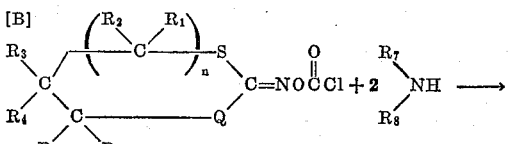

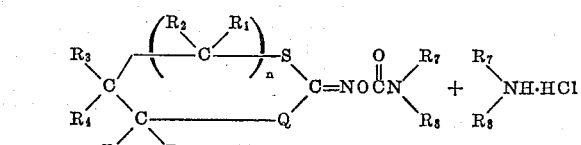

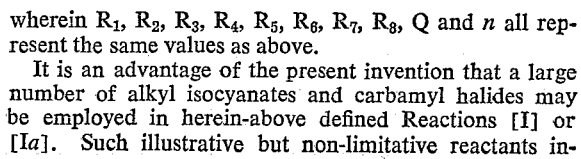

wherein $R_1$, $R_2$, $R_3$, $R_4$, $R_5$, $R_6$, $R_7$, $R_8$, Q and $n$ all represent the same values as above.

It is an advantage of the present invention that a large number of alkyl isocyanates and carbamyl halides may be employed in herein-above defined Reactions [I] or [Ia]. Such illustrative but non-limitative reactants include, for instance, methyl isocyanate, ethyl isocyanate, propyl isocyanate, t-butyl isocyanate, n-pentyl isocyanate, n-hexyl isocyanate and heptyl isocyanate as well as carbamyl chloride, N-methyl carbamyl chloride, N,N-dimethyl carbamyl chloride, N,N-diethyl carbamyl bromide, N,N-dipropyl carbamyl chloride and N,N-dibutyl carbamyl iodide.

In the above reaction designated as [B], ammonia and a variety of alkyl amines can advantageously be employed. Exemplary amines are: methylamine, ethylamine, propylamine, butylamine, dimethylamine, diethylamine, dipropylamine, dibutylamine, diamylamine, dihexylamine, homologs and isomers thereof.

The heterocyclic reactants possessing the desired 2-oximino substituent can be prepared from a variety of heterocyclic compounds which include:

2-imino-1,3-dithiolane
2-imino-1,3-oxathiolane
2-imino-1,3-dithiane
2-imino-1,3-oxathiane
2-methylimino-1,3-dithiolane
2-ethylimino-1,3-oxathiolane
2-n-propylimino-1,3-dithiane
2-n-butylimino-1,3-oxathiane as well as the ring-substituted lower alkyl or ring-substituted phenyl derivatives thereof.

In general, the 2-imino heterocyclic sulfur reactant can be initially prepared in a straightforward manner by bringing into reactive combination approximately equimolar amounts of a cyanogen halide and a thiol, such as ethanedithiol-1,2, 1-hydroxy-2 mercapto-ethane, propanedithiol-1,2, propanedithiol-1,3, 1-mercapto-3-hydroxypropane, 1,3-dithiol-2-methyl-n-propane, butanedithiol-1,2 or 2,5-dimethylhexane-dithiol-3,4, homologs and isomers thereof, preferably in the presence of an acidified alcoholic catalyst, such as hydrogen chloride-ethanol when utilizing a dithiol as the reactant. However, a 2-alkylimino heterosulfur reactant can be prepared by reacting a lower alkyl ammonium alkyldithiocarbamate salt and an alkylene dihalide, such as ethylene bromide, ethylene chloride, 1,2-dibromopropane, 1,3-diiodopropane and 1,3-dichloropropane. Resultant 2-imino heterocyclic sulfur hydrohalide or 2-alkylimino-heterocyclic sulfur hydrohalide can be reacted next with a hydroxylamine salt, such as either hydroxylamine hydrohalide or hydroxylamine sulfate, to obtain 2-oximino-hetero-sulfur derivatives which are utilized as reactants herein.

In order to facilitate a further understanding of the present invention, the following illustrative examples are presented. These are not to be taken as limitative of the invention. Unless otherwise stated, the parts are by weight.

EXAMPLE 1

*Preparation of 2-imino-1,3-dithiolane hydrochloride*

To a mixture of 25.0 parts of ethanedithiol in 125 parts (by volume) of dry acetonitrile at 0° C.–5° C. in a vessel equipped with a condenser, are added 17.2 parts of cyanogen chloride over a thirty minute period. After stirring at 35° C.–40° C. for four hours, the mixture remains at room temperature overnight. The product is collected as colorless needles weighing 27.3 parts, corresponding to a yield of 66.2 percent of theory, and melting at 218° C.–220° C. with decomposition.

Analysis for $C_3H_6NClS_2$: Calculated—Cl, 22.8%. Found—Cl, 22.6%.

In the foregoing, similar results are obtained where cyanogen bromide is substituted for cyanogen chloride.

EXAMPLE 2

*Preparation of 2-imino-1,3-oxathiolane hydrochloride*

A mixture of 50 parts of mercaptoethanol in 200 parts of benzene in a flask equipped with a stirrer, ice-water-cooled condenser, gas inlet tube and thermometer is heated to 50° C. and 44 parts of a gaseous cyanogen chloride are passed in over a two and one-half hour period. The temperature rises spontaneously to 60° C.–65° C. when about half of the cyanogen chloride is added, solids begin forming, and the temperature stays at this level during the remainder of the addition period. After the mixture has been maintained at 40° C.–45° C. for an additional four and one-half hours and stayed overnight at room temperature, the solid 2-imino-1,3-oxathiolane hydrochloride amounting to 47 parts, or 52 percent of theory, is collected.

EXAMPLE 3

*2-imino-5-methyl-1,3-oxathiolane hydrochloride*

Example 1 above is repeated in every detail, except that 1-hydroxy-2-mercapto-n-propane is substituted for the ethanedithiol reactant therein. Resultant product, 2-imino-5-methyl-1,3-oxathiolane, is obtained in good yield and purity.

EXAMPLE 4

*Preparation of 2-isopropylimino-1,3-dithiolane*

To a stirred mixture of 10.0 parts of ethylene bromide and 8.8 parts of potassium carbonate in 75 parts of absolute ethanol at 38° C.–40° C. are added 10.4 parts of isopropylamino ammonium isopropyldithiocarbamate in small increments over a one-hour period. After heating to reflux for ten minutes, the mixture is cooled, resultant solids are filtered off, and the alcohol solution diluted with about three volumes of water. Extraction of the aqueous mixture with ether followed by stripping off the ether and distillation of the residue affords 6.5 parts or 76 percent of theory of 2-isopropylimino-1,3-dithiolane having a boiling point of 81° C.–83° C./0.30 mm. Hg and a refractive index ($n_D^{25}$) of 1.5671.

Analysis for $C_6H_{11}NS_2$: Calculated—C, 44.68; H, 6.88; S, 39.76. Found—C, 44.82; H, 7.09; S, 39.85.

EXAMPLE 5

*Preparation of 4-methyl-2-methylimino-1,3-dithiolane*

To a stirred mixture of 99.7 parts of 1,2-dibromopropane in 300 parts of ethanol at 40° C. are added 65.9 parts of methylamino ammonium methyldithiocarbamate over a period of one hour. After heating for an additional hour at 50° C., the mixture is cooled, 300 parts of ether and one equivalent of sodium hydroxide are added, and the organic phase is separated. The organic phase is dried with magnesium sulfate and the solvent stripped. Distillation of the residue yields 15.9 parts of desired product and 22.8 parts of unreacted dibromopropane. A sample of the product on redistillation boils at 54° C./0.04 mm., and has a refractive index ($n_D^{25}$) of 1.5781.

Analysis for $C_5H_9NS_2$: Calculated—C, 40.78; H, 6.16; S, 43.55. Found—C, 40.94; H, 6.17; S, 43.52.

EXAMPLE 6

*Preparation of 2-imino-1,3-dithiane hydrochloride*

To a mixture of 130 parts of chloroform nearly saturated with dry hydrogen chloride in a flask equipped with a stirrer, ice-water-cooled condenser, gas inlet tube and thermometer are added 27.7 parts of propane-1,3-dithiol. Subsequent slow addition of 18 parts of gaseous cyanogen chloride over a two-hour period causes a spontaneous temperature rise to 42° C. After completion of cyanogen chloride addition, the mixture is heated at 50° C.–55° C. for one hour. The crystalline product amounts to 24.1 parts or 55.5% of theory. The sample is sublimed at 95° C.–100° C./0.05 mm. Hg for analysis. It melts with darkening at 155° C.–160° C.

Analysis for $C_2H_8ClNS_2$: Calculated—C, 28.31; H, 4.75; Cl, 20.89. Found—C, 27.99; H, 5.18; Cl, 20.89.

EXAMPLE 7

*Preparation of 2-oximino-1,3-dithiolane*

A mixture of 0.21 part of 2-isopropylimino-1,3-dithiolane obtained in Example 4 above, and 0.10 part of hydroxylamine hydrochloride is heated on the steam bath with 3.0 parts of water and sufficient ethanol to initially dissolve the reactants. After two hours, most of the ethanol has boiled away and, on ice-cooling the remaining mixture, the product crystallizes. The water is decanted off and the solids are rinsed with water and vacuum-dried. The 2-oximino-1,3-dithiolane, melting point 124° C.–127° C., weighs 0.14 part or 80 percent of theory.

EXAMPLE 8

*Preparation of 2-oximino-1,3-oxathiolane*

A mixture consisting of 55.0 parts of 2-imino-1,3-dithiolane hydrochloride obtained in Example 1 above, 27.1 parts of hydroxylamine hydrochloride and 34.8 parts of sodium acetate is mixed at 70° C.–75° C. for one hour. Crystallization of the resultant oxime occurred. After cooling to room temperature and filtering, a 87.6 percent yield of colorless 2-oximino-1,3-dithiolane is obtained, melting at 126° C.–128° C.

EXAMPLE 9

*Preparation of 2-oximino-1,3-oxathiolane*

To a stirred mixture of 19.0 parts of 2-imino-1,3-oxathiolane hydrochloride and 10.4 parts of hydroxylamine hydrochloride in 75 parts of water are added 12.3 parts of solid sodium acetate in increments over a two-hour period. After twenty-four hours, 12.5 parts of solid sodium bicarbonate are added slowly. The mixture is filtered, the filtrate is diluted with an equal volume of a saturated salt solution, and the mixture is continuosly ether extracted for fourteen hours. The semi-solid residue obtained by evaporation of the ether is extracted several times with hot benzene. The benzene on dilution with hexane gives several fractions of solids which are combined. Recrystallization from benzene plus a small quantity of hexane affords 5.2 parts, or 32 percent of theory of 2-oximino-1,3-oxathiolane having a melting point of 111° C.–116° C. Sample recrystallized further melts at 116.4° C.–117.2° C.

Analysis for $C_3H_5NO_2S$: Calculated—C, 30.24; H, 4.23; N, 11.76; S, 26.91. Found—C, 30.29; H, 4.24; N, 11.76; S, 26.96.

EXAMPLE 10

*Preparation of 4-methyl-2-oximino-1,3-dithiolane*

A solution of 10.0 parts of 4-methyl-2-methylimino-1,3-dithiolane and 5.2 parts of hydroxylamine hydrochloride in 80 parts of 40% ethanol is heated on a steam bath for four hours. The yellow oily product obtained after extracting the reaction mixture with ether, treating the ether solution with activated carbon and magnesium sulfate, and stripping off the ether, amounts to 9.1 parts or 90 percent of theory. The infrared spectrum shows the expected C=N— band absorption at 1600 cm.$^{-1}$.

EXAMPLE 11

*Preparation of 2-oximino-1,3-dithiane*

A mixture of 18.0 parts of 2-imino-1,3,dithiane hydrochloride, 8.1 parts of hydroxylamine hydrochloride, and 9.6 parts of sodium acetate in 200 parts of water is slowly heated to 64° C. over a one-hour period and then to 75° C. over the next fifteen minutes. After cooling the mixture, extraction with ether in the usual manner affords 11.6 parts of product as an oil which soon crystallizes. Recrystallization from the benzene-hexane mixture gives 8.9 parts of the oxime, melting point 92.4° C.–94.8° C. A small sample recrystallized once again for analysis melts at 94.0° C.–95.0° C.

Analysis for $C_4H_7NOS_2$: Calculated—C, 32.19; H, 4.73; N, 9.39; S, 42.97. Found—C, 32.11; H, 4.86; N, 9.30; S, 42.98.

EXAMPLE 12

*Preparation of 2-oximino-5-methyl-1,3-oxathiolane*

To an agitated mixture of 100.0 parts of 2-imino-5-methyl-1,3-oxathiolane hydrochloride and 45.3 parts of hydroxylamine hydrochloride in 200 parts of dry methanol are added in increments at room temperature over a one hour period 53.4 parts of sodium acetate. After stirring the mixture at room temperature overnight, it is heated at 50° C. for two hours and then cooled. There are then added 66 parts of potassium bicarbonate and 200 parts of ether followed by stirring for two hours, and the reaction mixture is then filtered. The filtrate is concentrated. Extraction of the residue successively with benzene and ether, followed by concentration of the ether-benzene mixture, yields 56.9 parts of crude product. The oil remaining from the benzene-ether extraction is mixed with methanol and 200 parts of chloroform and the mixture is washed successively with partially saturated salt solution and with a saturated salt solution. After filtering through magnesium sulfate, concentration of the chloroform mixture leaves another 23.0 parts of crude oxime. Recrystallization of the combined crude oxime from a 1:1 benzene-ether mixture gives 40.0 parts, or 46.2 percent of theory of product, having a melting point equal to 92° C.–94° C. A sample, vacuum sublimed for analysis, melts at 94.0° C.–95.2° C.

Analysis for $C_4H_7NO_2S$: Calculated—C, 36.07; H, 5.30; N, 10.52; S, 24.08. Found—C, 36.27; H, 5.45; N, 10.56; S, 24.21.

EXAMPLE 13

*Preparation of 4,5-dimethyl-2-oximino-1,3-dithiolane*

A mixture of 15.0 parts of 4,5-dimethyl-2-imino-1,3-dithiolane hydrochloride, 6.3 parts of hydroxylamine hydrochloride, and 7.8 parts of sodium acetate in 115 parts of water are stirred and heated at 75° C.–80° C. for one hour. The solids, which form on ice-cooling the mixture, are collected, washed with water and allowed to dry. Recrystallization from benzene-hexane affords 10.1 parts, or 75.6 percent of theory, of colorless product melting at 100° C.–103° C.

Analysis for $C_5H_9NOS_2$: Calculated—C, 36.78; H, 4.38; N, 8.58; S, 39.27. Found—C, 37.33; H, 4.43; N, 8.57; S, 39.37.

EXAMPLE 14

*Preparation of 4-n-butyl-2-oximino-1,3-dithiolane*

A mixture of 13.0 parts of 4-n-butyl-2-imino-1,3-dithiolane hydrochloride, 4.7 parts of hydroxylamine hydrochloride, and 5.8 parts of sodium acetate is stirred and heated at 70° C.–80° C. for two hours. On cooling, a viscous oil separates. The water is decanted away from the oil and the oil taken up with ether and dried by filtration through magnesium sulfate. Evaporation of the ether gives 10.7 parts or 91.8% of theory, of the oxime. The infrared absorption curve of the oxime shows bands at 950 cm.$^{-1}$ and 1580 cm.$^{-1}$ attributable to the

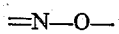

and =C=N— bonds, respectively, and several bands in the 2800 cm.$^{-1}$ and 3300 cm.$^{-1}$ region assignable to the —OH function.

EXAMPLE 15

*Preparation of 4-phenyl-2-oximino-1,3-dithiolane*

The procedure of Example 14 is repeated in every detail, except that 2.8 parts of 4-phenyl-2-imino-1,3-dithiolane hydrochloride are employed in lieu of the 4-n-butyl dithiolane reactant to provide 2.3 parts, or 91.7 percent of theory, of 4-phenyl-2-oximino-1,3-dithiolane as a viscous oil. The infrared absorption curve of this product, in addition to showing numerous bands assignable to the phenyl ring, shows a =C=N band at 1575 cm.$^{-1}$ and three bands assignable to the N—O—H function at 2800 cm.$^{-1}$, 2920 cm.$^{-1}$ and 3200 (broad) cm.$^{-1}$.

EXAMPLE 16

*Preparation of N-methyl carbamate of 2-oximino-1,3-dithiolane*

To 5.3 parts of 2-oximino-1,3-dithiolane dissolved partially in 20 parts of dry ether in a suitable ice-cooled reaction flask are added 2.5 parts (by volume) of methyl isocyanate and 0.1 part of triethylamine. The flask is then removed from the ice-bath and the mixture is stirred at room temperature for twelve hours. A yield of 97 percent of desired carbamate is obtained as a solid melting at 81° C.–83° C. Recrystallization from the benzene-hexane mixture yields N-methyl carbamate of 2-oximino-1,3-dithiolane melting at 82.2° C.–83.4° C. Calculated for $C_5H_8N_2O_2S_2$, the carbon, hydrogen and sulfur contents are, respectively, 31.2; 4.2 and 33.4, all in percent. It is found that the carbon, hydrogen and sulfur analysis, respectively, is: 31.4; 4.4 and 33.3, all in percent.

Substituting n-hexyl isocyanate (6.08 parts) for the methyl isocyanate above, N-hexyl carbamate of 2-oximino-1,3-dithiolane is obtained in 93% yield.

EXAMPLE 17

*Preparation of N-ethyl-carbamate of 2-oximino-1,3-dithiolane*

To a suitable ice-cooled reaction vessel are added 5.0 parts of 2-oximino-1,3-dithiolane in 20 parts (by volume) of dry ether and 2.6 parts (by volume) of ethylisocyanate and 0.1 part of triethylamine. The contents of the flask are then stirred for twenty-four hours at room temperature. After stripping off the ether, the ethyl carbamate product is collected as an oil which crystallizes on seeding. Recrystallization from benzene-petroleum ether yields 55 percent of the N-ethyl carbamate product having a melting point of 51.0° C.–52.5° C. and analyzes in percent as follows for $C_6H_{10}N_2O_2S_2$:

Calculated—C, 34.9; H, 4.9; S, 31.1. Found—C, 35.1; H, 4.8; S, 31.2.

EXAMPLE 18

*Preparation of N,N-dimethyl-carbamate of 2-oximino-1,3-dithiolane*

To a suitable reaction vessel are added 7.0 parts of the sodium salt of 2-oximino-1,3-dithiolane in 50 parts (by volume) of dry acetone and 4.7 parts of dimethyl carbamyl chloride. After refluxing the mixture for three hours, an equal volume of water is added and the dimethyl carbamate product is extracted with a 50–50 ether-benzene mixture. Recrystallization from a methanol-water mixture yields 58 percent of the desired product having a melting point of 94.2° C.–95.0° C. and analyzes in percent as follows for $C_6H_{10}N_2O_2S_2$:

Calculated—C, 34.9; H, 4.9; S, 31.1. Found—C, 35.2; H, 4.9; S, 31.2.

EXAMPLE 19

*Preparation of the carbamate of 2-oximino-1,3-dithiolane*

Into an ice-cooled reaction vessel equipped with an ice-cooled condenser and containing 75 parts (by volume) of dry ether are added 18.9 parts of phosgene. To this mixture is next introduced in increments a total of 10.0 parts of the sodium salt of 2-oximino-1,3-dithiolane over a thirty-minute period. After stirring the mixture at room temperature for about fifteen hours, excess phosgene is removed by distillation. The remaining mixture is ice-cooled. The latter is then added to a solution of 2.2 parts of ammonia in 100 parts (by volume) of dry acetonitrile. After removing the ice bath to allow the mixture to come to room temperature, the mixture is filtered and the filtrate stripped of solvent. The solid residue is extracted in a Soxhlet apparatus with petroleum ether to remove impurities, such as unreacted chlorocarbonate intermediate. These solids together with those obtained after removal of inorganic salts from the original filter cake with water, amount to 9.1 parts, or 80 percent of theory, of the carbamate of 2-oximino-1,3-dithiolane having a melting point equal to 130° C.–132° C. After recrystallization from a chloroform-hexane mixture, the product melts at 133° C.–135° C. and analyzes in percent as follows for $C_4H_6N_2O_2S_2$:

Calculated—C, 27.1; H, 3.4; N, 15.7; S, 36.0. Found—C, 27.2; H, 3.6; N, 15.9; S, 35.8.

EXAMPLE 20

*Preparation of the N-methyl carbamate of 2-oximino-1,3-oxathiolane*

A mixture of 1.67 parts of 2-oximino-1,3-oxathiolane, 0.90 part (by volume) of methyl isocyanate, and a trace of triethylamine in 10 parts of dry ether is allowed to stand for two days. Evaporation of the ether and recrystallization of the residue from an isopropanol-hexane mixture gives 1.43 parts, or 57.8 percent of theory, of the carbamate, having a melting point of 88.2° C.–90.2° C. A second recrystallization renders a product melting at 89.6° C.–90.8° C.

Analysis for $C_5H_8N_2O_3S$: Calculated—C, 34.07; H, 4.58; N, 15.90; S, 18.20. Found—C, 34.40; H, 4.94; N, 16.05; S, 18.37.

EXAMPLE 21

*Preparation of the N-methyl carbamate of 4-methyl-2-oximino-1,3-dithiolane*

A mixture of 9.1 parts of 4-methyl-2-oximino-1,3-dithiolane, 3.7 parts (by volume) of methyl isocyanate and 0.3 part of triethylamine in 75 parts of dry ether is stirred and allowed to stand overnight. Evaporation of the ether renders a crude oil product. The major portion of crude material is purified by molecular distillation to give 8.6 parts, or 68 percent of theory, of the pure product.

Analysis for $C_6H_{10}N_2O_2S_2$: Calculated—C, 34.93; H, 4.89; N, 13.58; S, 31.09. Found—C, 34.91; H, 5.18; N, 13.81; S, 30.99.

EXAMPLE 22

*Preparation of the N-methyl carbamate of 2-oximino-1,3-dithiane*

To an ice-cooled mixture of 6.0 parts of 2-oximino-1,3-dithiane and 0.2 part of triethylamine in 25 parts of dry ether are added 2.5 parts (by volume) of methylisocyanate. After coming to room temperature, the mixture is refluxed for two hours. Sufficient chloroform is added to dissolve the oil which formed and the mixture is washed with dilute sodium hydroxide solution and water and dried. Stripping off the solvent leaves 6.0 parts or 72 percent of theory of product as an oil which is induced to crystallize and melts at 89° C.–92° C. Recrystallization from a benzene-hexane mixture yields short, colorless needles having a melting point of 92.8° C.–93.8° C.

Analysis for $C_6H_{10}N_2O_2S_2$: Calculated—C, 34.93; H, 4.86; S, 31.09. Found—C, 35.29; H, 5.26; S, 31.08.

EXAMPLE 23

*Preparation of the N-methyl carbamate of 4,5-dimethyl-2-oximino-1,3-dithiolane*

To a stirred ice-cooled mixture of 9.0 parts of 4,5-dimethyl-2-oximino-1,3-dithiolane and 0.1 part of triethylamine in 25 parts of dry ether are pipetted 3.8 parts by volume of methylisocyanate. The ice bath is removed after 30 minutes and the mixture allowed to stand overnight. The mixture is recooled by means of an ice-bath. Thus-formed solids are collected and recrystallized from benzene-hexane to yield 10.1 parts or 82.1 percent of theory of the carbamate having a melting point of 74° C.–77° C. and analyzing as follows for $C_7H_{12}N_2O_2S_2$:

Calculated—C, 38.17; H, 5.49; N, 12.72; S, 29.11. Found—C, 38.25; H, 5.64; N, 12.78; S, 29.18.

EXAMPLE 24

*Preparation of the N-methyl carbamte of
5-methyl-2-oximino-1,3-oxathiolane*

The procedure described in Example 16 is followed in every detail employing 5-methyl-2-oximino-1,3-oxathiolane hydrochloride instead of 2-oximino-1,3-dithiolane and chloroform instead of ether as solvent. The solid N-methyl carbamate of 5-methyl-2-oximino-1,3-oxathiolane melting at 95° C.–98° C. is obtained in 92 percent yield after recrystallization from benzene-hexane. Resultant carbamate analyzes as follows:

Calculated for $C_6H_{10}N_2O_3S$—C, 38.09; H, 4.80; N, 14.86, S, 16.95. Found—C, 38.01; H, 5.32; N, 14.80; S, 16.85.

EXAMPLE 25

*Preparation of the N-methyl carbamate of
4-n-butyl-2-oximino-1,3-dithiolane*

The procedure described in Example 16 is followed employing 4-n-butyl-2-oximino-1,3-dithiolane instead of 2-oximino-1,3-dithiolane. The N-methylcarbamate of 4-n-butyl-2-oximino-1,3-dithiolane is obtained in 73 percent yield as a solid melting at 75° C.–78° C. after recrystallization from ether-petroleum ether. On analysis, the following data is further obtained:

Calculated for $C_9H_{16}N_2O_2S_2$—C, 43.69; H, 6.11; N, 11.33; S, 25.92. Found: C, 43.69; H, 6.06; N, 11.42; S, 26.10.

EXAMPLE 26

*Preparation of the N-methyl carbamate of
4-phenyl-2-oximino-1,3-dithiolane*

The procedure of Example 16 is followed employing 4-phenyl-2-oximino-1,3-dithiolane instead of 2-oximino-1,3-dithiolane. The N-methyl carbamate of 4-phenyl-2-oximinio-1,3-dithiolane is recovered in 64 percent yield as a solid melting at 131° C.–133° C. after recrystallization from methanol-water. The carbamate analyzes as follows:

Calculated for $C_{11}H_{12}N_2O_2S_2$—C, 49.22; H, 4.51; N, 10.44; S, 23.89. Found—C, 49.01; H, 5.03; N, 10.30; S, 23.68.

EXAMPLE 27

*Preparation of the N-methyl carbamate of
4,4-dimethyl-2-oximino-1,3-dithiolane*

The procedure of Example 16 is repeated in every detail, except that 4,4-dimethyl-2-oximino-1,3-dithiolane is employed instead of 2-oximino-1,3-dithiolane. The crude solid carbamate is employed directly for insecticidal testing. It is characterized by its infrared absorbtion spectrum which shows an N—H band at 3300 cm.$^{-1}$, a >C=O band at 1720 cm.$^{-1}$, a >C=N band at 1540 cm.$^{-1}$, and an >N—O band at 940 cm.$^{-1}$.

To illustrate the insecticidal activity of the carbamates of 2-oximino-1,3-dithiolanes, 1,3-oxathiolanes, 1,3-dithianes and 1,3-oxathianes of the present invention, the following example is presented:

EXAMPLE 28

Representative compounds illustrated by structure in the table below are diluted with a mixture of 65–35 acetone-water, respectively, to produce the several tabulated concentrations. Pots containing two or three nasturtium plants two inches tall are infested with nasturtium aphids two days before they are selected for testing. The pots are placed on a turntable and the plants are sprayed with a test compound. It is observed that the percent kill of the aphids for each concentration given in the table below is high. Typical values are shown.

TABLE I

| Compound | Percent Kill Aphids—Concentration | | |
|---|---|---|---|
| | .1% | .01% | .001% |
| $CH_2$—S, $CH_2$—S / C=N—OCNHCH$_3$ | 100 | 100 | 100 |
| $CH_2$—S, $CH_2$—S / C=N—OCNHC$_2$H$_5$ | 100 | 100 | 85 |
| $CH_2$—S, $CH_2$—S / C=N—OCN(CH$_3$)$_2$ | 100 | 100 | 100 |
| $CH_2$—S, $CH_2$—S / C=NOCNH$_2$ | 100 | 100 | 100 |
| $CH_2$—S, $CH_2$—O / C=N—OCNHCH$_3$ | 100 | 100 | 100 |
| $CH_2$—S, $CH_3$—CH—S / C=N—OCNHCH$_3$ | 100 | 100 | 100 |
| $H_2C$(CH$_2$—S)(CH$_2$—S) / C=NOCNHCH$_3$ | 100 | 100 | 95 |
| $CH_2$—S, $CH_3$—CH—O / C=NOCNHCH$_3$ | 100 | 100 | 100 |
| C$_6$H$_5$—CH—S, $CH_2$—S / C=NOCNHCH$_3$ | 90 | 0 | — |
| $C_4H_9$—CH—S, $CH_2$—S / C=NOCNHCH$_3$ | 100 | 100 | 95 |
| $CH_3$—CH—S, $CH_3$—CH—S / C=NOCNHCH$_3$ | 100 | 100 | 100 |
| $CH_3$, $CH_3$—C—S, $CH_2$—S / C=N—OCNHCH$_3$ | 100 | 100 | 100 |

It is an advantage to utilize the insecticidal compositions of the present invention in dilute concentrations by incorporating the latter compounds in a variety of inert carriers or diluents. For instance, the compounds may be dissolved in an inert organic solvent such as acetone, ethyl acetate, ethyl alcohol, benzene, kerosene and equivalets thereof, or they may be admixed with an inert solid carrier as, for example, fuller's earth, bentonite, and the like. If desired, a suspension of the active compounds may be prepared by employing a non-solvent. In that event, it is advantageous to add thereto any commercially available dispersing or surface-active agent of the anionic or nonionic types.

Although the compounds of the present invention have been illustrated as possessing activity against aphids, they can also be advantageously employed in dilute concentrations as excellent miticides.

The quantity of inert solid or liquid carrier or diluent

I claim:
1. A carbamate of the formula:

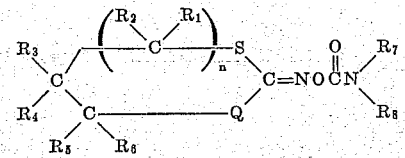

wherein $R_1$, $R_2$, $R_3$, $R_4$, $R_5$, and $R_6$ are each selected from the group consisting of hydrogen, lower alkyl and phenyl, Q represents an atom selected from the group consisting of oxygen and sulfur, $n$ is an integer from 0 to 1, and $R_7$ and $R_8$ are each a radical selected from the group consisting of hydrogen and lower alkyl.

2. The carbamate of 2-oximino-1,3-dithiolane.
3. The N-methyl carbamate of 2-oximino-1,3-dithiolane.
4. The N-methyl carbamate of 2-oximino-1,3-oxathiolane.
5. The N-methyl carbamate of 2-oximino-4-methyl-1,3-dithiolane.
6. The N-methyl carbamate of 2-oximino-1,3-dithiane.
7. A process for the preparation of a carbamate of the formula:

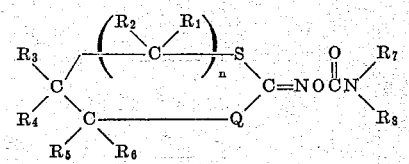

wherein $R_1$, $R_2$, $R_3$, $R_4$, $R_5$ and $R_6$ are each selected from the group consisting of hydrogen, lower alkyl and phenyl, Q represents an atom selected from the group consisting of oxygen and sulfur $R_7$ and $R_8$ are each a radical selected from the group consisting of hydrogen and lower alkyl, and $n$ is an integer from 0 to 1, which comprises the step of: bringing into reactive combination substantially equimolar quantities of a first reactant of the formula:

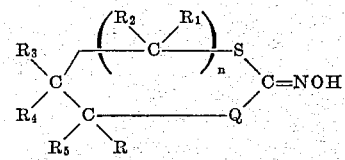

wherein $R_1$, $R_2$, $R_3$, $R_4$, $R_5$ and $R_6$, Q and $n$ have the same values as above, and a second reactant selected from the group consisting of lower alkyl isocyanate, carbamyl halide and N-lower alkyl carbamyl halide, and thereafter recovering said carbamate.

8. A process for the preparation of a carbamate of the formula:

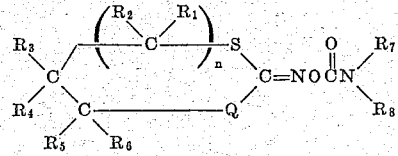

wherein $R_1$, $R_2$, $R_3$, $R_4$, $R_5$ and $R_6$ are each selected from the group consisting of hydrogen, lower alkyl and phenyl, Q represents an atom selected from the group consisting of oxygen and sulfur, $R_7$ and $R_8$ are each a radical selected from the group consisting of hydrogen and lower alkyl, and $n$ is an integer from 0 to 1, which comprises the step of: bringing into reactive combination substantially equimolar quantities of a first reactant of the formula:

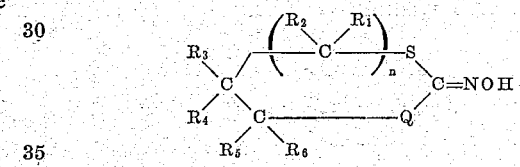

wherein $R_1$, $R_2$, $R_3$, $R_4$, $R_5$ and $R_6$, Q and $n$ have the same values as above, phosgene as a second reactant, further reacting the resultant reaction mixture with about two mols of a third reactant selected from the group consisting of ammonia, a lower alkyl primary amine and a lower alkyl secondary amine, and thereafter recovering said carbamate.

References Cited by the Examiner

UNITED STATES PATENTS

| | | | |
|---|---|---|---|
| 2,974,084 | 3/61 | Mayhew et al. | 167—33 |
| 3,008,966 | 11/61 | Hauptschein et al. | 260—327 |
| 3,081,311 | 3/63 | Sullivan et al. | 260—327 |

WALTER A. MODANCE, *Primary Examiner.*

NICHOLAS S. RIZZO, *Examiner.*